(12) United States Patent
Jones et al.

(10) Patent No.: US 10,531,135 B2
(45) Date of Patent: Jan. 7, 2020

(54) NETWORK RECORDING APPARATUS

(71) Applicant: Telefonaktiebolaget LM Ericsson (publ), Stockholm (SE)

(72) Inventors: Anthony Richard Jones, Southampton (GB); Tomer Amiaz, Raanana (IL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/067,854

(22) PCT Filed: Jan. 4, 2016

(86) PCT No.: PCT/EP2016/050023
§ 371 (c)(1),
(2) Date: Jul. 3, 2018

(87) PCT Pub. No.: WO2017/118470
PCT Pub. Date: Jul. 13, 2017

(65) Prior Publication Data
US 2019/0014360 A1    Jan. 10, 2019

(51) Int. Cl.
*H04N 21/2343* (2011.01)
*H04N 21/231* (2011.01)
*H04N 21/232* (2011.01)
*H04N 21/2662* (2011.01)

(52) U.S. Cl.
CPC ..... *H04N 21/23439* (2013.01); *H04N 21/231* (2013.01); *H04N 21/232* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 2008/0195698 A1 | 8/2008 | Stefanovic et al. | |
| 2009/0083279 A1 | 3/2009 | Hasek | |
| 2010/0017516 A1* | 1/2010 | Sparrell | H04N 21/23106 709/226 |
| 2012/0110036 A1* | 5/2012 | Rabii | H04N 21/41407 707/822 |
| 2012/0331089 A1 | 12/2012 | Vonog et al. | |
| 2013/0114744 A1* | 5/2013 | Mutton | H04N 19/40 375/240.26 |
| 2014/0247887 A1* | 9/2014 | Brueck | H04N 19/40 375/240.26 |

OTHER PUBLICATIONS

International Search Report and Written Opinion issued in International Application No. PCT/EP2016/050023, dated Apr. 6, 2016, 13 pages.

* cited by examiner

*Primary Examiner* — Omar S Parra
(74) *Attorney, Agent, or Firm* — Rothwell, Figg, Ernst & Manbeck, P.C.

(57) ABSTRACT

There is provided a method in a network recording apparatus, the method comprising: receiving a video; determining how many clients the video is being distributed to; and encoding and storing of the video dependent upon how many clients the video is being distributed to.

16 Claims, 8 Drawing Sheets

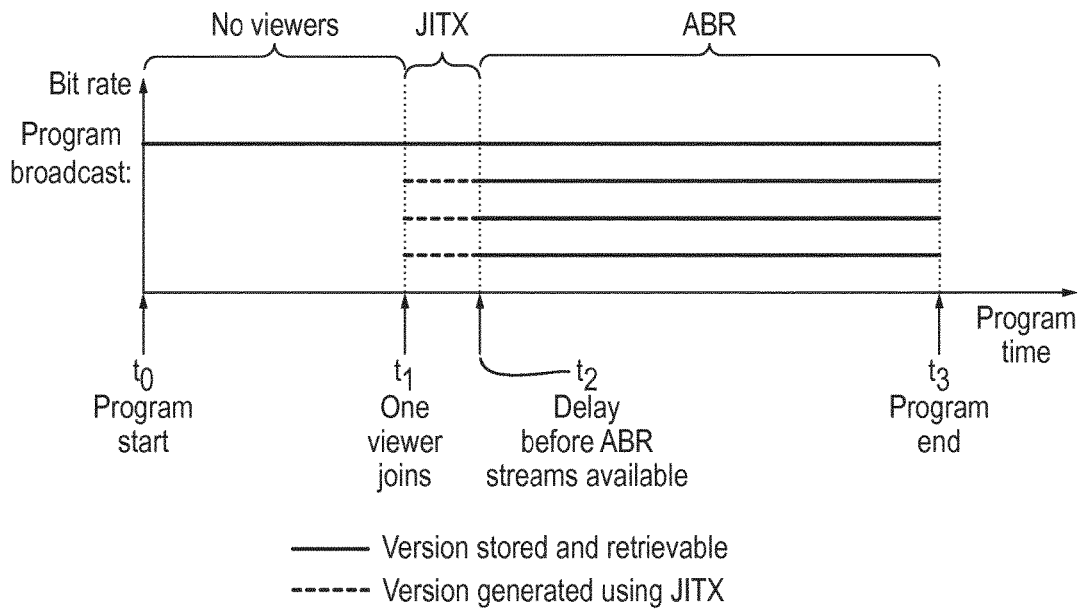
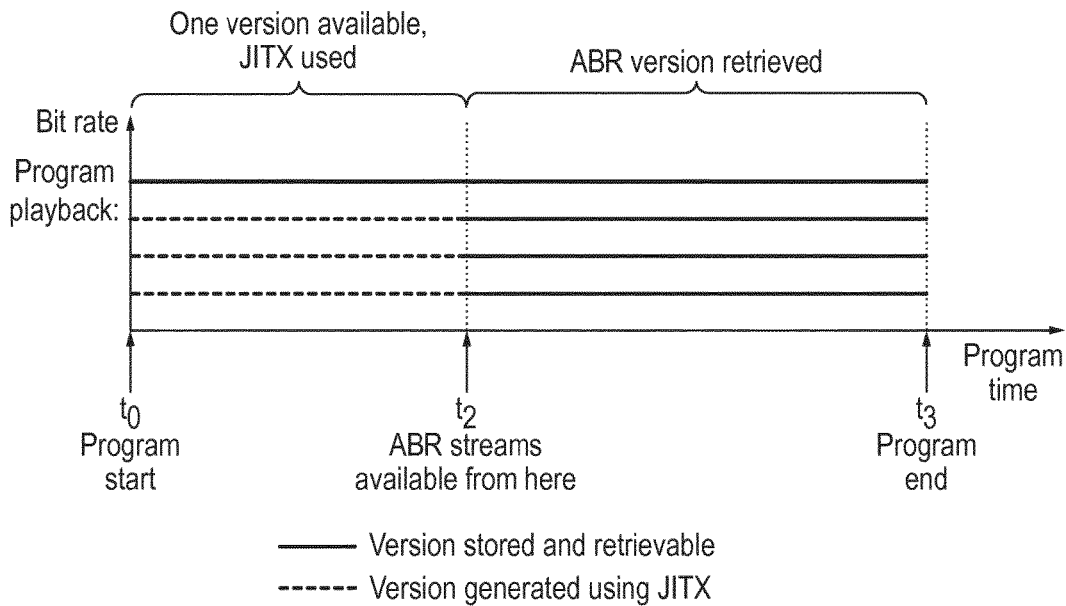

ical video recorder (PVR). A DVR records video in a digital format to a disk drive, USB flash drive, SD memory card, solid state drive, or other local mass storage device.
NETWORK RECORDING APPARATUS

CROSS REFERENCE TO RELATED APPLICATION(S)

This application is a 35 U.S.C. § 371 National Stage of International Patent Application No. PCT/EP2016/050023, filed Jan. 4, 2016, designating the United States, the disclosure of which is incorporated by reference.

TECHNICAL FIELD

The present application relates to a method in a network recording apparatus; a network recording apparatus; an apparatus for recording video in a network; and a computer-readable medium.

BACKGROUND

A television service operator delivers television services to its subscribers. The service operator provides a set top box to the subscriber in order to decode a transmitted signal and output this to, for example, a television. The functionality provided by set top boxes has improved in recent decades, and now certain functionality such as recording, multiple tuners, and access to on-demand content may be provided by the set top box.

A set top box with recording functionality may be called a digital video recorder (DVR). Television service transmission is typically digital, which is more efficient than analog transmission, and hence the received video is in a digital format lending itself well to digital video recording. A DVR may sometimes be referred to as a personal video recorder (PVR). A DVR records video in a digital format to a disk drive, USB flash drive, SD memory card, solid state drive, or other local mass storage device.

The television service operator must provide a set top box to every subscriber. This hardware represents a significant expense. Further, any maintenance cost incurred by this fleet of set top boxes is typically covered by the service provider. As such, a small reduction in the cost and complexity of a set top box can have a significant benefit to the service operator. To this end, some service operators have removed any mass storage capability from their set top boxes. Instead, DVR functionality is provided by a network DVR (also known as cloud DVR) system. In a network DVR, recorded content is not stored locally but at a server on the operator's network (in the cloud). When the user wishes to watch the recorded content it is streamed from the server to the user device over an internet connection.

An important technology for delivering video over an internet connection is adaptive bit rate (ABR) streaming. This technology allows for a variation in bandwidth which is typical for a home internet connection. This variation may be due to local contention with other devices and users in the home using the same modem connection for other purposes. A further cause for the variation in available bandwidth is local loop contention where the bandwidth between a plurality of modems in a neighborhood must be shared between a respective plurality of homes.

ABR streaming allows for a variation in bandwidth by measuring the available bandwidth between a streaming device and a server that is sending the streamed video, and providing the video stream at a bit rate that maximizes the use of the available bandwidth. To achieve this, a server that uses ABR will make the streamed video available at a plurality of different bit rates. The ABR streaming client in the streaming device then selects the appropriate bit rate version. The set of bit rates is normally fixed.

A network DVR system which delivers content using ABR streaming must store large volumes of video data, with multiple representations (at different bit rates) for each segment of content.

It is common for a television system to carry content which is not very popular. This may be due to regulatory requirements forcing the operator to broadcast certain content, or due to commercial constraints where certain channels have no viewers in the middle of the night. In some cases a television system may make a live stream available that very few clients or even no clients are streaming. Where such content is available using ABR, it is possible that the television system encodes a live stream in multiple bit rate versions suitable for ABR but that none of these are used for live streaming.

Further, if this not very popular content will be made available for future viewing in a catch up service, where the video will also be delivered using ABR, then each of the different bit rate versions will be stored. However, if the content had very few viewers when it was streamed live, it is unlikely to have many viewers as a catch up service.

Thus, there is a need for a network recording apparatus that more efficiently uses encoding and storage resources, particularly in respect of not very popular content.

SUMMARY

Accordingly, there is provided a method in a network recording apparatus, the method comprising: receiving a video; determining how many clients the video is being distributed to; and encoding and storing of the video dependent upon how many clients the video is being distributed to.

Encoding resources can be used more efficiently if a video that is live streamed to very few clients is encoded into only a single bit rate version. Where such a video is to be streamed using ABR to only a very few clients, alternative bit rate versions may be transcoded on the fly using just in time transcoding.

Furthermore, storage resources may equally be used more efficiently if, where a video that is live streamed to very few clients has only a single bit rate version stored. Where such a video is later retrieved from storage for catch-up streaming using ABR, alternative bit rate versions may be transcoded on the fly using just in time transcoding.

The network recording apparatus may comprise an encoder. The network recording apparatus may send instructions to a separate encoder. The network recording apparatus may instruct an encoder how to encode the video. The network apparatus may control the encoding of the video. The network recoding apparatus may control the storing of the video.

The method may further comprise encoding and storing the video dependent upon the video content complexity. The video content complexity may be determined by the encoder. A video content complexity indicator may be received with the video.

The method may further comprise controlling the number of versions of the video that are generated and stored. The method may further comprise controlling the encoding effort applied to the video. The encoding effort applied to a video may be determined by the amount of processing resource provided for the encoding. The encoding effort applied to a video may be determined by the number of or the complexity of encoding algorithms applied to the video.

If the number of clients that the video is being distributed to is less than a threshold value, then a single representation of the video may be stored. The single representation may comprise the highest bit rate version of an adaptive bit rate set of video versions. The single representation may comprise one bit rate version selected from an adaptive bit rate set of video versions.

If the number of clients the video is being distributed to is greater than a threshold value, then the video may be encoded at different bit rates to generate multiple representations of the video at different bit rates, and the multiple representations of the video are stored.

The method may further comprise: receiving a playback request for the stored video; retrieving the stored video; and delivering the stored video using adaptive bit rate streaming.

Where a single representation of the video is stored, the method may further comprise generating multiple bit rate versions of the video for adaptive bit rate streaming. Multiple bit rate versions of the video for adaptive streaming may be generated using just in time trans coding.

Just-in-time transcode (JITX) is a known technique which reduces the amount of storage required for a network DVR system. In known implementations only the highest bit rate representation of the ABR content is stored, and then from this representation a lower bit rate representation is derived by transcoding only when that representation is requested by a client.

Where a plurality of representations of the video are stored, the method may further comprise retrieving the plurality of versions for adaptive bit rate streaming.

There is further provided a network recording apparatus comprising a processor arranged to: receive a video; and determine how many clients the video is being distributed to; wherein the processor controls the encoding and controls the storing of the video dependent upon how many clients the video is being distributed to.

The network recording apparatus may further comprise storage for storing encoded video. The storage may comprise any form of digital storage, such as an array of either hard disk drives or solid state drives.

The network recording apparatus may further comprise a transcode module for transcoding video retrieved from storage.

The processor may further control the encoding and controls the storing of the video dependent upon the video content complexity. An indication of the content complexity may be received from the encoder.

The processor may instruct an encoder to control how many versions of the video are encoded. The network recording apparatus is further arranged to store the encoded versions of the video in the storage. The network recording apparatus may further instruct the encoder to control the encoding effort applied to the video. The encoding effort applied to a video may be determined by the amount of processing resource provided for the encoding. The encoding effort applied to a video may be determined by the number of or the complexity of encoding algorithms applied to the video.

If the number of clients that the video is being distributed to is less than a threshold value, then the network recording apparatus may store a single representation of the video. The single representation may comprise the highest bit rate version of an adaptive bit rate set of video versions. The single representation may comprise one bit rate version selected from an adaptive bit rate set of video versions.

If the number of clients the video is being distributed to is greater than a threshold value, then the network recording apparatus may store multiple representations of the video, the multiple versions encoded at different bit rates.

The network recording apparatus may be further arranged to: receive a playback request for the stored video; retrieve the stored video from storage; and deliver the stored video using adaptive bit rate streaming.

The network recording apparatus may further comprise a transcoder, the transcoder arranged such that where a single representation of the video is stored, the transcoder generates multiple bit rate versions of the video for adaptive bit rate streaming. Multiple bit rate versions of the video for adaptive streaming may be generated using just in time transcoding.

Just-in-time transcode (JITX) is a known technique which reduces the amount of storage required for a network DVR system. In known implementations only the highest bit rate representation of the ABR content is stored, and then from this representation a lower bit rate representation is derived by transcoding only when that representation is requested by a client.

There is further provided an apparatus for recording video in a network, the apparatus comprising a processor and a memory, said memory containing instructions executable by said processor. The apparatus is operative to: receive a video; and determine how many clients the video is being distributed to; wherein the processor controls the encoding and controls the storing of the video dependent upon how many clients the video is being distributed to.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

BRIEF DESCRIPTION OF THE DRAWINGS

A network recording apparatus will now be described, by way of example only, with reference to the accompanying drawings, in which:

FIGS. 2a and 2b show an adaptive streaming system and network recording system;

DETAILED DESCRIPTION

Figure 1:
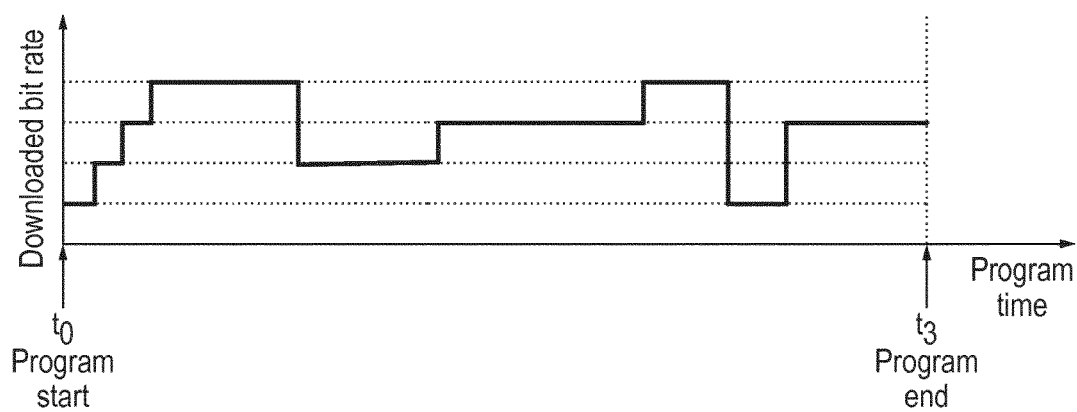
FIG. 1 illustrates an example of adaptive bit rate streaming for a program having a finite duration.

FIG. 1 illustrates an example of adaptive bit rate streaming for a program having a finite duration and a start time at $t_0$ and an end time at $t_1$. Here, a program is available in four bit rate versions, these illustrated by the dotted lines with bit rate on the vertical axis. Adaptive bitrate streaming is a method of video streaming over HTTP where the source content is encoded at multiple bit rates, four in this example. Each of the different bit rate streams are segmented into small multi-second parts. The streaming client retrieves a manifest file from which it learns of the four available streams at differing bit rates, and the addresses of segments of the streams. When starting, the client requests the segments from the lowest bit rate stream. If the client finds the download speed is greater than the bit rate of the segment downloaded, then it will request the next higher bit rate segments. In this example the client quickly steps up to the highest bit rate version. Later, if the client finds the download speed for a segment is lower than the bit rate for the segment, and therefore the network throughput has deteriorated, then it will request a lower bit rate segment. The segment length can vary depending on the particular implementation, but they are typically between two and ten seconds.

FIG. 2 illustrates an adaptive streaming system and network recording system as presented herein. FIG. 2a shows a broadcast program being streamed live. The program starts at time $t_0$, but has no viewers. Only the top bit rate version is encoded, and only this version is stored for later viewing by the network recording apparatus. A short time into the program, at $t_1$, a viewer joins the broadcast stream. That is, the viewer requests the live stream of the program. In response to this request the encoder initiates the creation of multiple bit rate streams for delivery of the program using adaptive bitrate streaming, however, these will not be available to the client until a short time later at $t_2$. Between time $t_1$ and $t_2$, the client receives the broadcast program using adaptive bit rate streaming, but the different bit rate versions of the program are generated by a just-in-time-transcoder (JITX) based upon the encoded and stored highest bit rate version. The highest bit rate version is transcoded to generate the other bit rate versions, the required one of which can then be delivered to the client. At time $t_2$, all the bit rate versions are available from the encoder and the just-in-time transcoder is no longer needed. All bit rate versions of the program encoded by the encoder are stored for later retrieval and transmission in a catch-up or on-demand service provided by the network recorder.

FIG. 2b illustrates the same program being played back at a later time. The program is delivered to a client using adaptive bit rate streaming. However, from the start of the program at $t_0$ until $t_2$, only the highest bit rate version is available from the network recording apparatus. Alternative bit rate versions are generated using just-in-time transcoding. However, after time $t_2$, the network recording apparatus had stored all bit rate versions and between time $t_2$ and time $t_3$, when the program ends, the program can be delivered using adaptive bit rate streaming with the different bit rate versions retrieved from storage by the network recording apparatus.

Figure 3A:
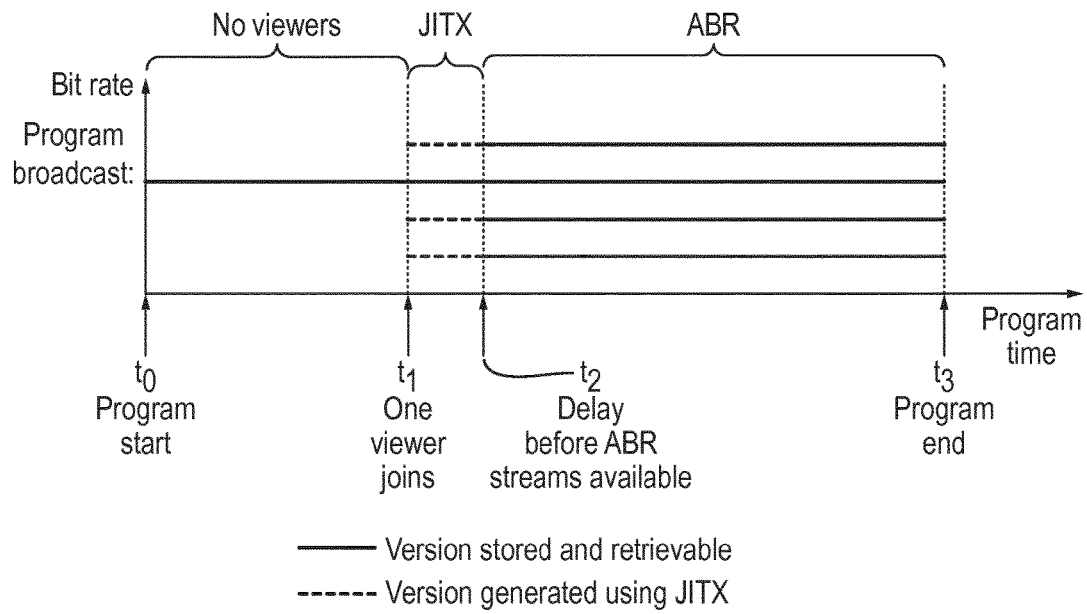
FIGS. 3a and 3b show an alternative example of the operation of the adaptive streaming system and network recording system.

FIG. 3 illustrates an alternative example of the operation of the adaptive streaming system and network recording system as presented herein. FIG. 3a shows a broadcast program being streamed live. The program starts at time $t_0$, but has no viewers. Only one bit rate version is encoded, and only this version is stored for later viewing by the network recording apparatus, but this is not the top bit rate version as illustrated in the example of FIG. 2.

Here, the second highest bit rate version is encoded and stored. This choice may be the result of a predetermined rule—that when one bit rate version is stored, the second highest bit rate version should be stored, or it may be the result of an assessment taking into account at least one of: encode quality, content complexity, content popularity, and storage availability.

A short time into the program, at $t_1$, a viewer joins the broadcast stream. That is, the viewer requests the live stream of the program. In response to this request the encoder initiates the creation of multiple bit rate streams for delivery of the program using adaptive bitrate streaming, however, these will not be available to the client until a short time later at $t_2$. Between time $t_1$ and $t_2$, the client receives the broadcast program using adaptive bit rate streaming, but the different bit rate versions of the program are generated by a just-in-time-transcoder (JITX) based upon the encoded and stored bit rate version. The stored bit rate version is transcoded to generate the other bit rate versions, the required one of which can then be delivered to the client. At time $t_2$, all the bit rate versions are available from the encoder and the just-in-time transcoder is no longer needed. All bit rate versions of the program encoded by the encoder are stored for later retrieval and transmission in a catch-up or on-demand service provided by the network recorder.

Figure 3B:
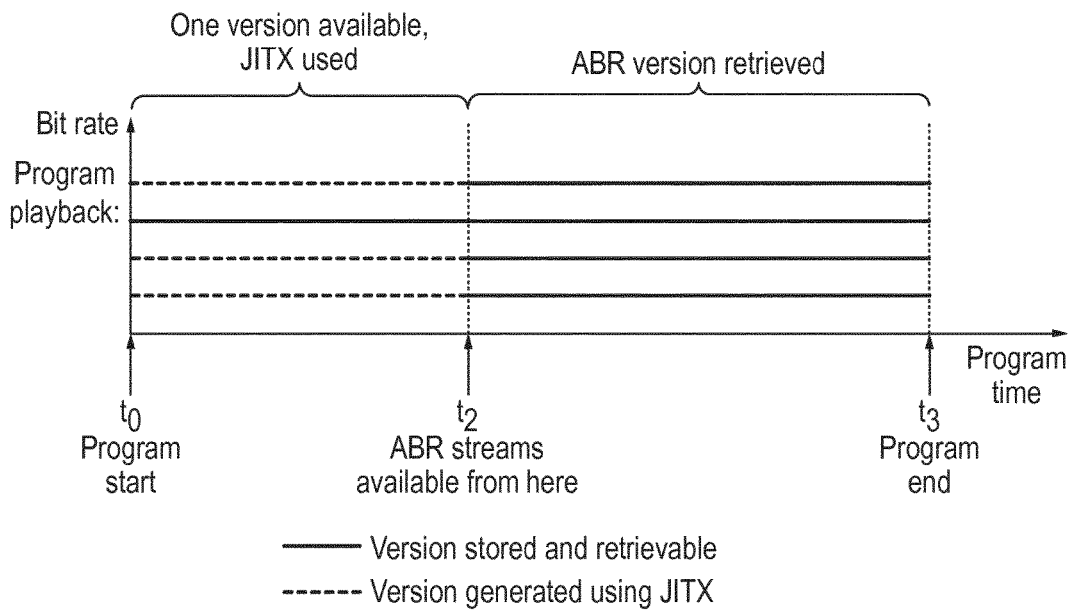

FIG. 3b illustrates the same program being played back at a later time. The program is delivered to a client using adaptive bit rate streaming. However, from the start of the program at $t_0$ until $t_2$, only the stored bit rate version is available from the network recording apparatus. Alternative bit rate versions are generated using just-in-time transcoding. However, after time $t_2$, the network recording apparatus had stored all bit rate versions and between time $t_2$ and time $t_3$, when the program ends, the program can be delivered using adaptive bit rate streaming with the different bit rate versions retrieved from storage by the network recording apparatus.

Figure 4:
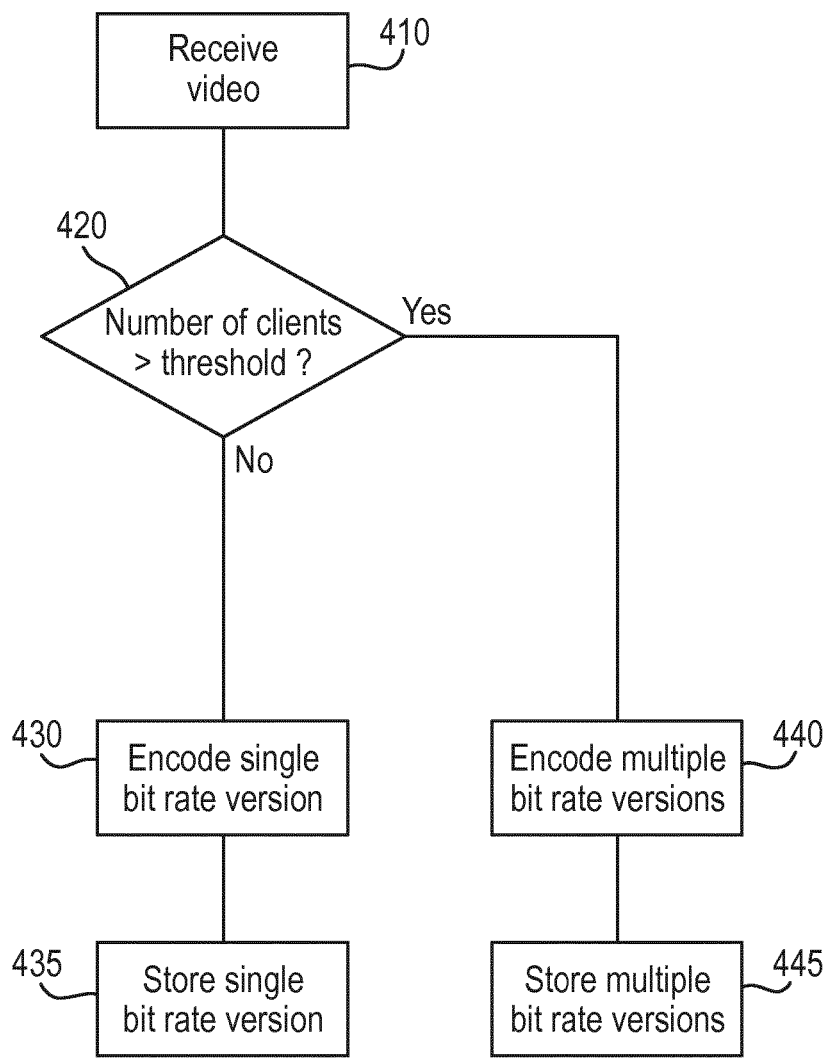
FIG. 4 shows a method of operating a network recording apparatus.

FIG. 4 illustrates a method of operating a network recording apparatus as described herein. The method comprises receiving a video 410 and then making a determination 420 as to whether the number of clients receiving a live stream of the content is greater than a threshold value. In the examples of FIGS. 2 and 3 the threshold value was 0, but in certain circumstances benefits may still be realized using just-in-time transcoding for a plurality of viewers. For example, where 14 different bit rate levels are used for delivery of video by adaptive bit rate streaming, then using just-in-time transcoding for up to 3 live clients may be more efficient than creating all the different bit rate versions of the video.

If it is determined that the number of clients does not exceed a threshold value then only a single bit rate version of the video is encoded 430 and stored 435 for later streaming via on-demand video. If it is determined that the number of clients exceeds the threshold value then multiple bit rate versions of the video are encoded 440, these multiple bit rate versions suitable for delivery using adaptive bit rate streaming. These multiple bit rate versions are stored 445 for later retrieval when the video is required for delivery via a client request for on-demand viewing.

If very few people or are watching a live stream then there are two benefits realized by the above described method. Firstly, encoding all available bit rate versions of a video for adaptive bit rate streaming is a waste of processing resources where none or only a small proportion of these is required for live delivery of the content. Accordingly, encoding resources are saved, this saving can be used to run fewer encoders so saving energy, or to apply more processing resources to content that does need encoding, improving encoding quality for that content.

Second, if very few people are watching a particular video when it is streamed live it can be inferred that the content is not very popular and is unlikely to be requested for later viewing through an on-demand delivery service. Therefore, encoding and storing a plurality of bit rate versions of this video is a waste of encoding resources and storage space as it is unlikely that they will be requested for future viewing. Still, by applying the method described herein, these programs can be made available for future viewing with an efficient use of encoding and storage resources.

Figure 5:
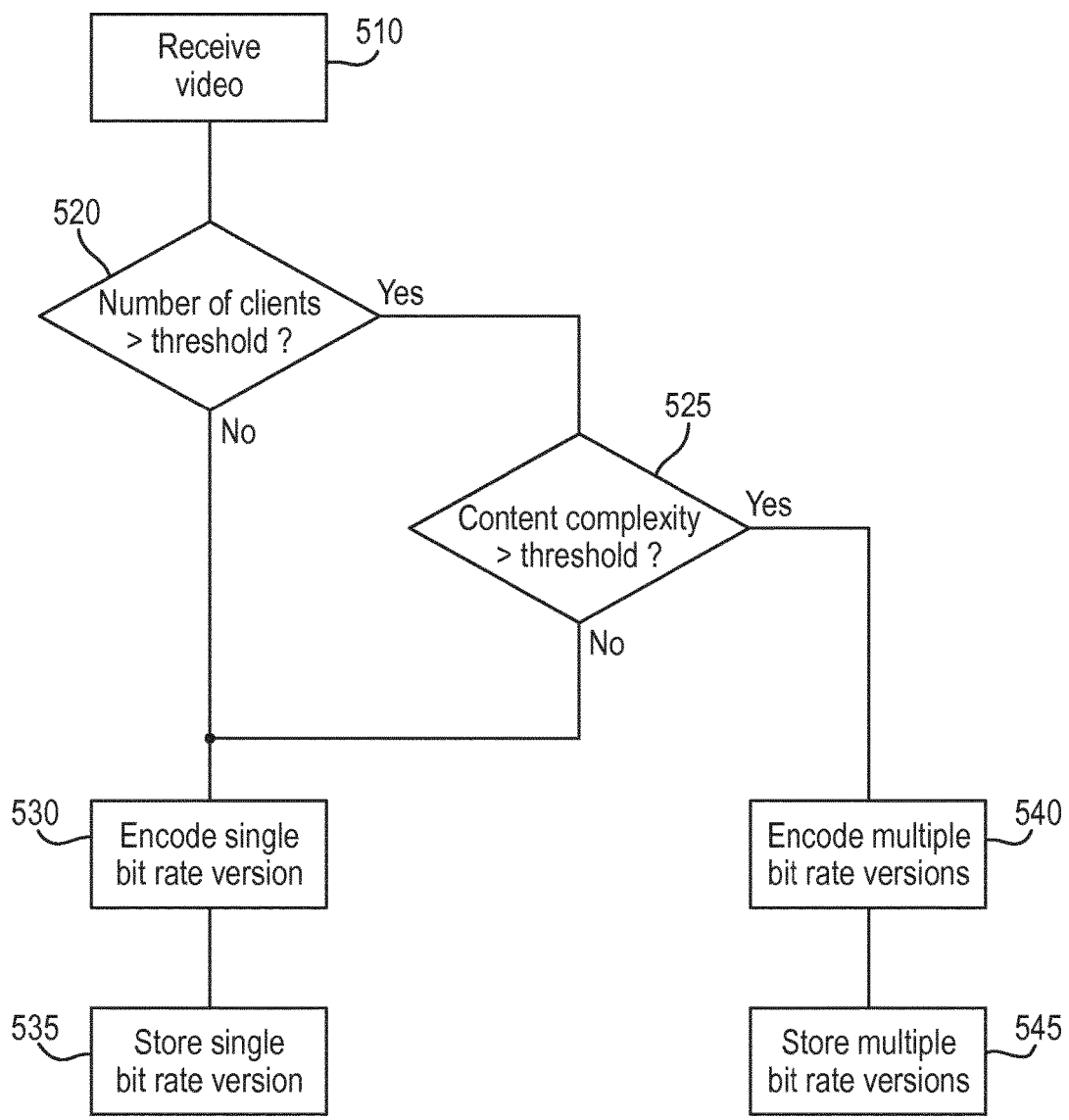
FIG. 5 shows an alternative method of operating a network recording apparatus.

FIG. 5 illustrates an alternative method of operating a network recording apparatus as described herein. The method comprises receiving a video 510 and then making a determination 520 as to whether the number of clients receiving a live stream of the content is greater than a threshold value. If it is determined that the number of clients does not exceed a threshold value then only a single bit rate version of the video is encoded 530 and stored 535 for later streaming via on-demand video.

If it is determined 520 that the number of clients exceeds the threshold value then a further determination 525 is made as to whether the content complexity exceeds a threshold value. Content complexity can be determined using a wide variety of metrics. On a basic level, content complexity can be determined from program metadata, for example a news program or game show comprising primarily talking heads is less complex video content than a football game or an action film. Alternatively, content complexity can be estimated from an incoming encoded source by evaluating how the source was encoded, for example by using a combination of bit rate and quantization factor. Content complexity information may also be provided as metadata with the incoming source (for example as determined by an upstream encoder). Furthermore, content complexity may be determined by encoding the video and measuring how difficult it was to encode; or it can be estimated by a pre-processing stage that uses measurements such as the spatial and temporal activity of the uncompressed content.

If it is determined 525 that the content complexity does not exceed a threshold then only a single bit rate version of the video is encoded 530 and stored 535 for later streaming via on-demand video.

If it is determined 525 that the content complexity exceeds a threshold then multiple bit rate versions of the video are encoded 540, these multiple bit rate versions suitable for delivery using adaptive bit rate streaming. These multiple bit rate versions are stored 545 for later retrieval when the video is required for delivery via a client request for on-demand viewing.

In this example, multiple bit rate versions of the video are encoded and stored only if the number of clients exceeds a first threshold and also the content complexity exceeds a second threshold. Here, it is determined that relatively simple content is more efficiently encoded and stored as a single bit rate representation with just-in-time transcoding used to generate the different bit rate versions required for both live streaming and also subsequent on-demand viewing. This reduces encoding and storage requirements at the cost of more just-in-time transcoding. However, for low complexity content, this is an acceptable trade-off.

Figure 6:
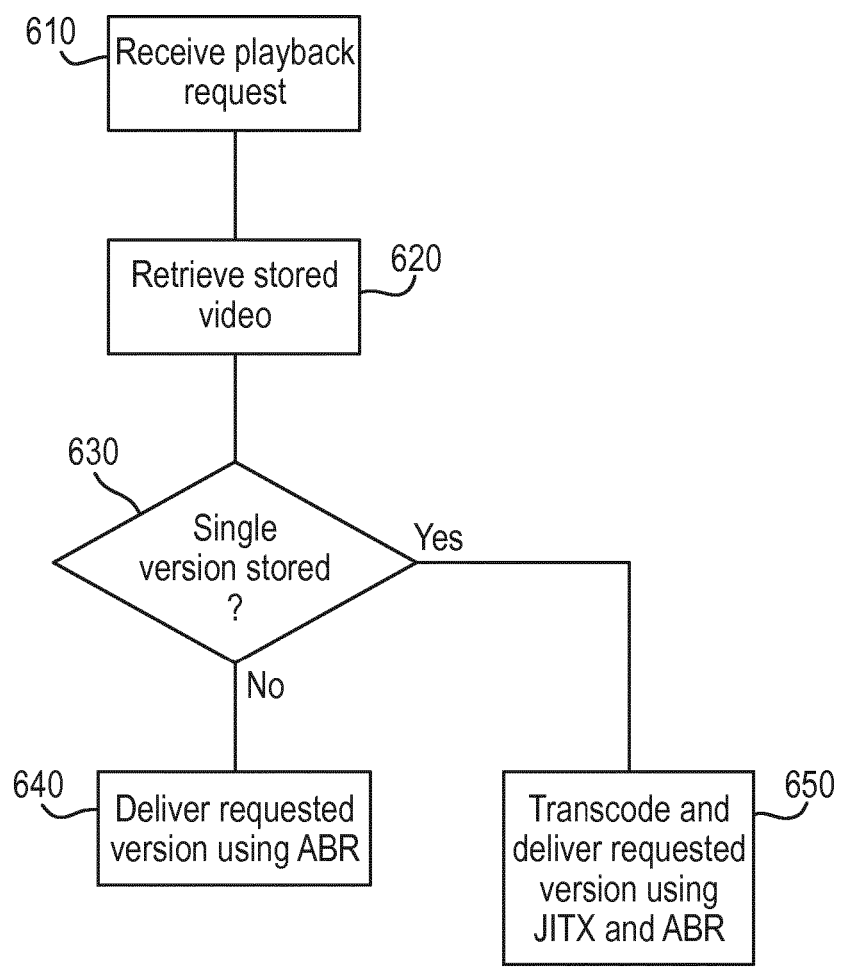
FIG. 6 shows how the network recording apparatus handles a playback request for stored content.

FIG. 6 illustrates how the network recording apparatus described herein handles a playback request for stored content. The network recording apparatus receives 610 a playback request from a client. The network recording apparatus retrieves 620 the requested video from storage and determines 630 whether a single bit rate version of the video has been stored. If multiple bit rate versions of the video are available from storage, then the network recording apparatus delivers 640 the appropriate bit rate version of the video to the client using adaptive bit rate streaming.

If only a single bit rate version of the video has been stored then the network recording apparatus transcodes 650 that single version using just-in-time transcoding and delivers 650 the video at the appropriate bit rate required using adaptive bit rate streaming. Here, the different bit rate version of the video, which are required for delivery using adaptive bit rate streaming, are generated using just-in-time transcoding. The user of the client that requested the video will likely be unaware of which process (640 or 650) was used to deliver the requested content to their video client.

Furthermore, there is provided a method in a network recording apparatus, the method comprising: receiving a video; determining how many clients the video is being distributed to; and encoding and storing of the video dependent upon how many clients the video is being distributed to.

As explained above, encoding resources can be used more efficiently if a video that is live streamed to very few clients is encoded into only a single bit rate version. Where such a video is to be streamed using ABR to only a very few clients, alternative bit rate versions may be transcoded on the fly using just in time transcoding. Also, storage resources may equally be used more efficiently if, where a video that is live streamed to very few clients has only a single bit rate version stored. Where such a video is later retrieved from storage for catch-up streaming using ABR, alternative bit rate versions may be transcoded on the fly using just in time transcoding.

The network recording apparatus may include an encoder. The network recording apparatus may send instructions to a separate encoder. The network recording apparatus may instruct an encoder how to encode the video. The network recording apparatus may control the encoding of the video. The network recoding apparatus may control the storing of the video.

The method may further comprise encoding and storing the video dependent upon the video content complexity. The video content complexity may be determined by the encoder. A video content complexity indicator may be received with the video. This may comprise controlling the number of versions of the video that are generated and stored, and/or controlling the encoding effort applied to the video.

The encoding effort applied to a video may be determined by the amount of processing resource provided for the encoding. The encoding effort applied to a video may be determined by the number of or the complexity of encoding algorithms applied to the video.

If the number of clients that the video is being distributed to is less than a threshold value, then a single representation of the video is stored. The single representation may comprise the highest bit rate version of an adaptive bit rate set of video versions. The single representation may comprise one bit rate version selected from an adaptive bit rate set of video versions.

If the number of clients the video is being distributed is greater than a threshold value, then the video is encoded at different bit rates to generate multiple representations of the video at different bit rates, and the multiple representations of the video are stored.

The method may further comprise: receiving a playback request for the stored video;
retrieving the stored video; and delivering the stored video using adaptive bit rate streaming. Where a single representation of the video is stored, multiple bit rate versions of the video are generated for adaptive bit rate streaming. Multiple bit rate versions of the video for adaptive streaming may be generated using just in time transcoding.

Just-in-time transcode (JITX) is a known technique which reduces the amount of storage required for a network DVR system. In known implementations only the highest bit rate representation of the ABR content is stored, and then from this representation a lower bit rate representation is derived by transcoding only when that representation is requested by a client.

Figure 7:
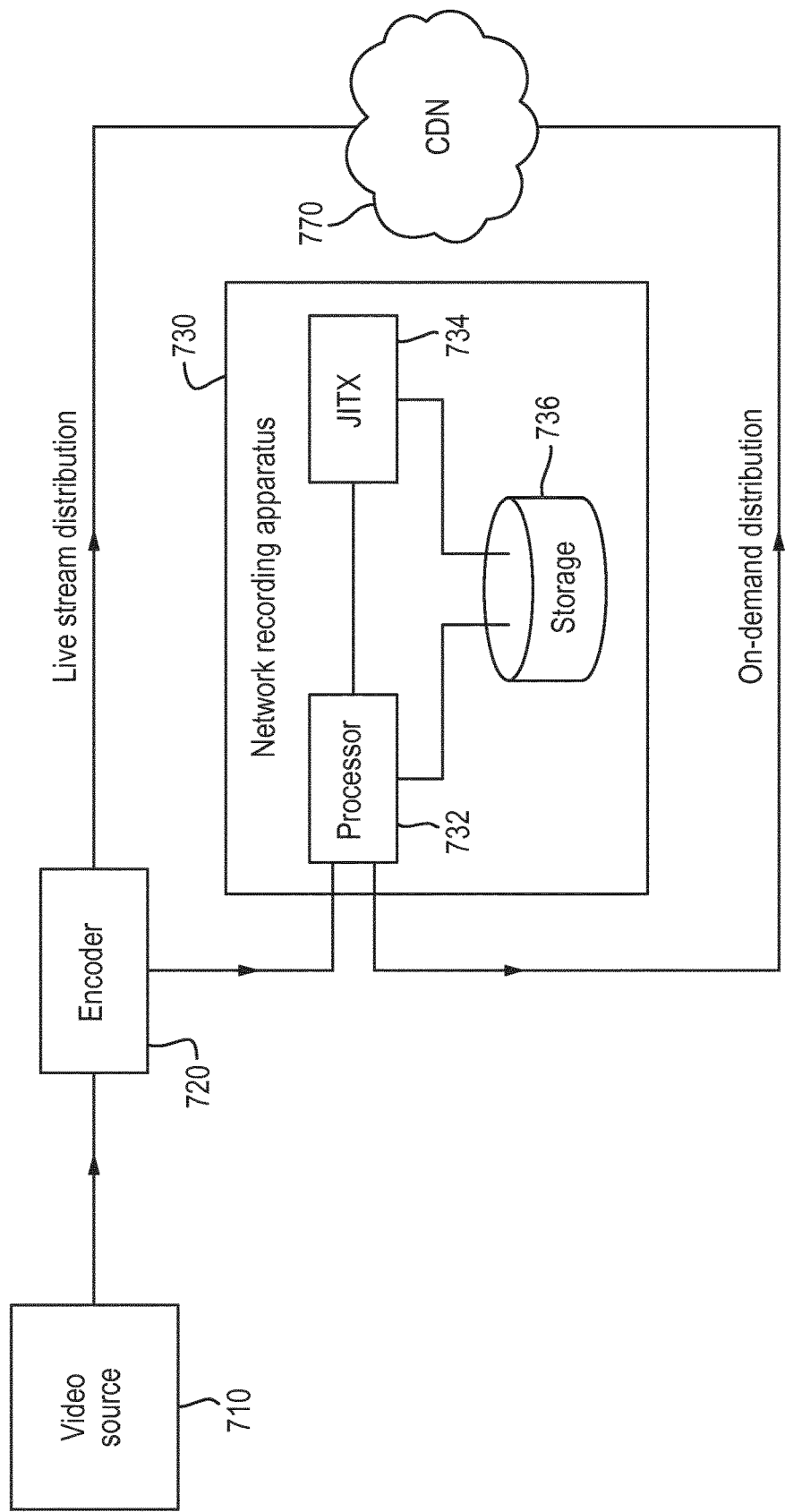
FIG. 7 shows an apparatus suitable for performing the methods described herein.

FIG. 7 illustrates an apparatus suitable for performing the above described methods. The apparatus comprises a video source 710, an encoder 720, a network recording apparatus 730 and a content delivery network (CDN) 770. Video from the video source 710 is encoded by the encoder 720 for live stream distribution over the CDN 770. Encoded video from encoder 720 is also passed to the network recording apparatus 730 where it is stored for later retrieval. The network recording apparatus 730 can separately deliver recorded video for on-demand distribution over the CDN 770. Encoder 720 operates under control of the network recording apparatus 730 such that the bit rate versions encoded by encoder 720 are determined by the network recording apparatus 730.

Network recording apparatus 730 comprises a processor 732, a just-in-time transcoder 734 (JITX) and a storage device 736. The processor 732 is arranged to: receiving a video; and determine how many clients the video is being distributed to. The processor 732 controls the encoding and controls the storing of the video dependent upon how many clients the video is being distributed to.

The storage device 736 is for storing encoded video and may comprise any form of digital storage, such as an array of either hard disk drives or solid state drives. The JITX 734 is for transcoding video retrieved from storage and may comprise a transcode module. In certain embodiments the JITX may transcode a video for live stream distribution, this may be done for example where only a few clients are streaming the live video and it is determined that encoding all bit rate version sis unnecessary, but it is still required to deliver to the live stream to the few clients that require it.

In normal operation, the encoder 720 encodes video from the video source 710 and outputs the required bit rate versions for adaptive streaming over the CDN 770. At the same time the network recording apparatus 730 receives these bit rate versions and records the video versions in storage 736.

When the network recording apparatus 730 detects that the number of clients live streaming the video drops below a threshold, then the network recording apparatus 730 instructs the encoder 720 to encode a single bit rate version, which the network recording apparatus 730 receives and processor 732 stores this version of the video in storage 736.

The processor 732 instructs the encoder 720 to control how many versions of the video are encoded. The network recording apparatus 730 is further arranged to store the encoded versions of the video in the storage 736. The network recording apparatus 730 may further instruct the encoder to control the encoding effort applied to the video. The encoding effort applied to a video may be determined by the amount of processing resource provided for the encoding. The encoding effort applied to a video may be determined by the number of or the complexity of encoding algorithms applied to the video.

If the number of clients that the video is being distributed to is less than a threshold value, then the network recording apparatus 730 stores a single representation of the video. The single representation may comprise the highest bit rate version of an adaptive bit rate set of video versions. The single representation may comprise one bit rate version selected from an adaptive bit rate set of video versions.

If the number of clients the video is being distributed to is greater than a threshold value, then the network recording apparatus stores multiple representations of the video, the multiple versions encoded at different bit rates.

The processor 732 may also control the encoding and storing of the video dependent upon the video content complexity. An indication of the content complexity may be received from the encoder.

Later, when a request for on-demand playback of a stored video is received, the processor 732 in network recording apparatus 730 retrieves the requested video from storage 736 and JITX 734 transcodes this video to generate the required bit rate version or versions for delivery of the video using adaptive bit rate streaming over the CDN 770.

The network recording apparatus 730 is thus arranged to: receive a playback request for the stored video; retrieve the stored video from storage; and deliver the stored video using adaptive bit rate streaming.

Figure 8:
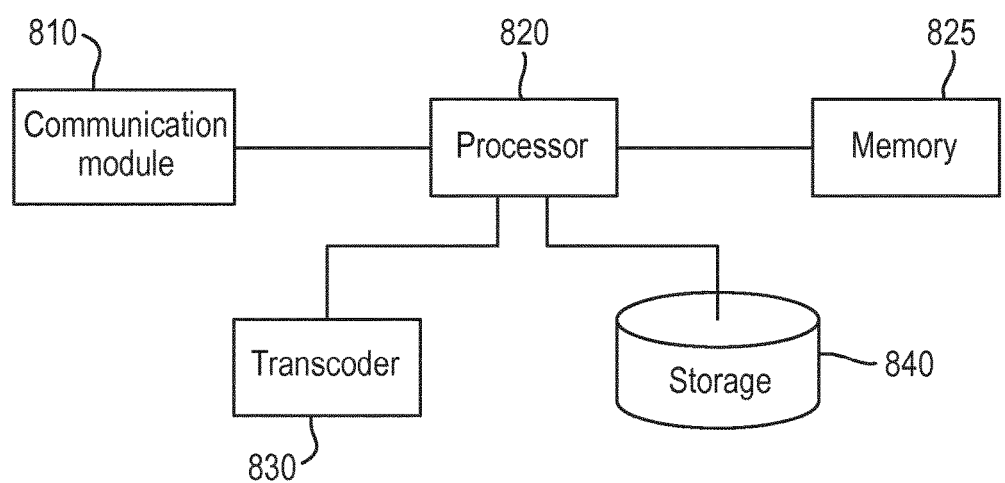
FIG. 8 shows a general apparatus for implementing the methods described herein.

FIG. 8 illustrates a general apparatus for implementing the methods described herein. The apparatus comprises a communication module 810, a processor 820, a memory 825, a transcoder 830 and storage 840.

The apparatus is suitable for recording video in a network. The memory 825 contains instructions executable by said processor 820 whereby said apparatus is operative to:

receiving a video; and determine how many clients the video is being distributed to; wherein the processor 820 controls the encoding and controls the storing of the video dependent upon how many clients the video is being distributed to.

The communication module 810 allows the apparatus to communicate with other components in the video distribution system. Storage device 840 is for storing encoded video and may comprise any form of digital storage, such as an array of either hard disk drives or solid state drives.

The transcoder 830 is arranged such that where a single representation of the video is stored, the transcoder 830 generates multiple bit rate versions of the video for adaptive bit rate streaming. Multiple bit rate versions of the video for adaptive streaming may be generated using just in time transcoding.

There is further provided a computer-readable medium, carrying instructions, which, when executed by computer logic, causes said computer logic to carry out any of the methods defined herein. There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The above described method may be carried out by suitably adapted hardware, such as an adapted form of the exemplary hardware implementation of a network recording apparatus as shown in FIG. 8, where the adaptation involves providing a mechanism for encoding and storing of the video dependent upon how many clients the video is being distributed to.

The method may also be embodied in a set of instructions, stored on a computer readable medium, which when loaded into a computer processor, Digital Signal Processor (DSP) or similar, causes the processor to carry out the hereinbefore described recording method.

Equally, the method may be embodied as a specially programmed, or hardware designed, integrated circuit which operates to carry out the method on video data loaded into the said integrated circuit. The integrated circuit may be formed as part of a general purpose computing device, such as a PC, and the like, or it may be formed as part of a more specialized device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or satellite or cable TV head end.

Another exemplary hardware embodiment of the present invention is that of a network recording apparatus comprising an Application Specific Integrated Circuit (ASIC).

The client may be a user apparatus. The client may be any kind of personal computer such as a television, a smart television, a set-top box, a games-console, a home-theatre personal computer, a tablet, a smartphone, a laptop, or even a desktop PC.

The examples of adaptive streaming described herein, are not intended to limit the streaming system to which the disclosed method and apparatus may be applied. The principles disclosed herein can be applied to any streaming system which uses different video qualities, such as HTTP Adaptive Streaming, Apple™ HTTP Live Streaming, and Microsoft™ Smooth Streaming.

It will be apparent to the skilled person that the exact order and content of the actions carried out in the method described herein may be altered according to the requirements of a particular set of execution parameters, such as speed of encoding, accuracy of detection, resolution of video sources, type of compression standards in use with the statistical multiplexing method, and the like. Accordingly, the order in which actions are described and/or claimed is not to be construed as a strict limitation on order in which actions are to be performed.

The invention claimed is:

1. A method in a network recording apparatus, the method comprising:
   receiving a video;
   encoding the video at a first bit rate and segmenting the video to produce a first plurality of video segments, wherein each video segment included in the first plurality of video segments was encoded at the first bit rate;
   storing the first plurality of video segments regardless of the number of clients to which the video is being distributed such that the first plurality of video segments are stored even when the video has not been requested by any client;
   determining the number of clients to which the video is being distributed;
   determining whether the determined number of clients is greater than or equal to a threshold;
   as a result of determining that the determined number of clients is greater than or equal to the threshold, encoding the video at a second bit rate to produce a second plurality of video segments where each video segment included in the second plurality of video segments was encoded at the second bit rate;
   storing the second plurality of video segments;
   after storing the first plurality of video segments and after determining that the determined number of clients is greater than or equal to the threshold, receiving a first request for a first segment of the video, wherein the first request was sent by a first client;
   in response to receiving the first request, retrieving from the first plurality of video segments a segment corresponding to the requested first segment;
   transcoding the retrieved segment of the video to produce the requested first segment of the video; and
   transmitting toward the first client the requested first segment of the video.

2. The method of claim 1, further comprising selecting the first bit rate based on video content complexity.

3. The method of claim 1, further comprising controlling the number of versions of the video that are generated and stored.

4. The method of claim 1, further comprising controlling effort of the encoding applied to the video.

5. The method of claim 1, further comprising, where a single representation of the video is stored, generating multiple bit rate versions of the video for adaptive bit rate streaming.

6. The method of claim 1, further comprising, where a plurality of representations of the video are stored, retrieving the plurality of versions for adaptive bit rate streaming.

7. A network recording apparatus, the network recording apparatus comprising:
   a memory; and
   a processor coupled to the memory, wherein the network recording apparatus is configured to:
   encode a video at a first bit rate and segmenting the video to produce a first plurality of video segments, wherein each video segment included in the first plurality of video segments was encoded at the first bit rate;
   store the first plurality of video segments regardless of the number of clients to which the video is being distributed such that the first plurality of video segments are stored even when the video has not been requested by any client;
   determine the number of clients to which the video is being distributed;
   determine whether the determined number of clients is greater than or equal to a threshold;
   as a result of determining that the determined number of clients is greater than or equal to the threshold, encode the video at a second bit rate to produce a second plurality of video segments where each video segment included in the second plurality of video segments was encoded at the second bit rate;
   store the second plurality of video segments;

after storing the first plurality of video segments and after determining that the determined number of clients is greater than or equal to the threshold, receive a first request for a first segment of the video, wherein the first request was sent by a first client;

in response to receiving the first request, retrieve from the first plurality of video segments a segment corresponding to the requested first segment;

transcode the retrieved segment of the video to produce the requested first segment of the video; and transmit toward the first client the requested first segment of the video.

8. The network recording apparatus of claim 7, further comprising a storage for storing the first plurality of video segments.

9. The network recording apparatus of claim 8, further comprising a transcode module for transcoding the retrieved segment of the video that is retrieved from the storage.

10. The network recording apparatus of claim 7, wherein the processor is configured to control the encoding and the storing of depending on video content complexity.

11. The network recording apparatus of claim 7, wherein the processor is configured to instruct an encoder to control how many versions of the video are encoded.

12. The network recording apparatus of claim 7, wherein the network recording apparatus is further configured to:

after determining that the determined number of clients is greater than or equal to the threshold and after storing the second plurality of video segments, receive a second request for a second segment of the video, wherein the second request was sent by a second client;

in response to receiving the second request, retrieve the requested second segment from the second plurality of video segments; and transmit toward the second client the requested second segment of the video.

13. The network recording apparatus of claim 12, further comprising a transcode module, wherein the transcode module is configured such that where a single representation of the video is stored, the transcode module is configured to generate multiple bit rate versions of the video for adaptive bit rate streaming.

14. An apparatus for recording a video in a network, the apparatus comprising:

a processor; and a memory containing instructions executable by said processor, wherein said apparatus is operative to:

encode a video at a first bit rate and segmenting the video to produce a first plurality of video segments, wherein each video segment included in the first plurality of video segments was encoded at the first bit rate;

store the first plurality of video segments regardless of the number of clients to which the video is being distributed such that the first plurality of video segments are stored even when the video has not been requested by any client;

determine the number of clients to which the video is being distributed;

determine whether the determined number of clients is greater than or equal to a threshold;

as a result of determining that the determined number of clients is greater than or equal to the threshold, encode the video at a second bit rate to produce a second plurality of video segments where each video segment included in the second plurality of video segments was encoded at the second bit rate;

store the second plurality of video segments;

after storing the first plurality of video segments and after determining that the determined number of clients is greater than or equal to the threshold, receive a first request for a first segment of the video, wherein the first request was sent by a first client;

in response to receiving the first request, retrieve from the first plurality of video segments a segment corresponding to the requested first segment;

transcode the retrieved segment of the video to produce the requested first segment of the video; and transmit toward the first client the requested first segment of the video.

15. A non-transitory computer-readable medium, carrying instructions, which, when executed by computer logic, causes said computer logic to carry out the method of claim 1.

16. The method of claim 1, further comprising:

after determining that the determined number of clients is greater than or equal to the threshold and after storing the second plurality of video segments, receiving a second request for a second segment of the video, wherein the second request was sent by a second client;

in response to receiving the second request, retrieving the requested second segment from the second plurality of video segments; and transmitting toward the second client the requested second segment of the video.

* * * * *